May 16, 1961  B. TEBB ET AL  2,983,974
HOOK FASTENER FOR TRANSMISSION OR CONVEYOR BELTS
Filed May 4, 1959  2 Sheets-Sheet 1
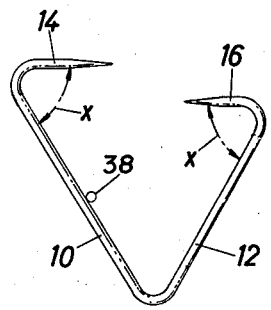
—FIG. 1.—
PRIOR ART
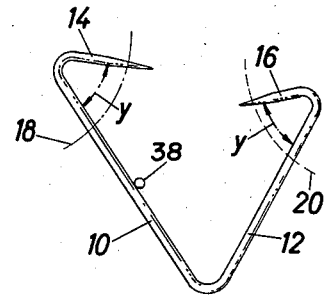
—FIG. 2.—
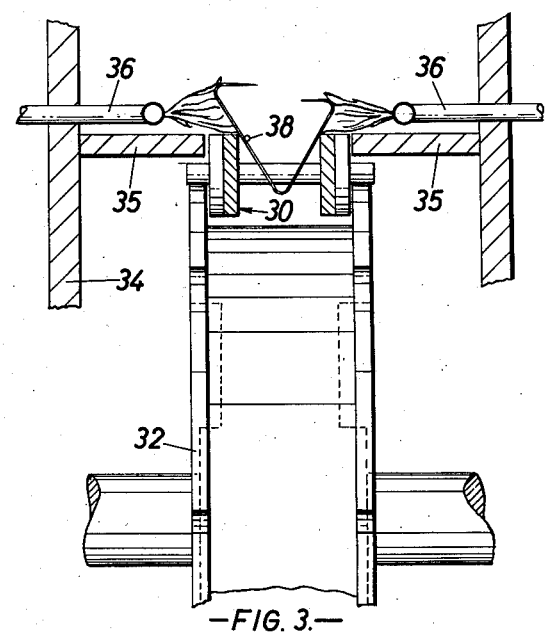
—FIG. 3.—
INVENTORS
Bernard Tebb
Clarence Herbert Perry
BY
Mead, Browne, Schuyler & Beveridge
ATTORNEYS

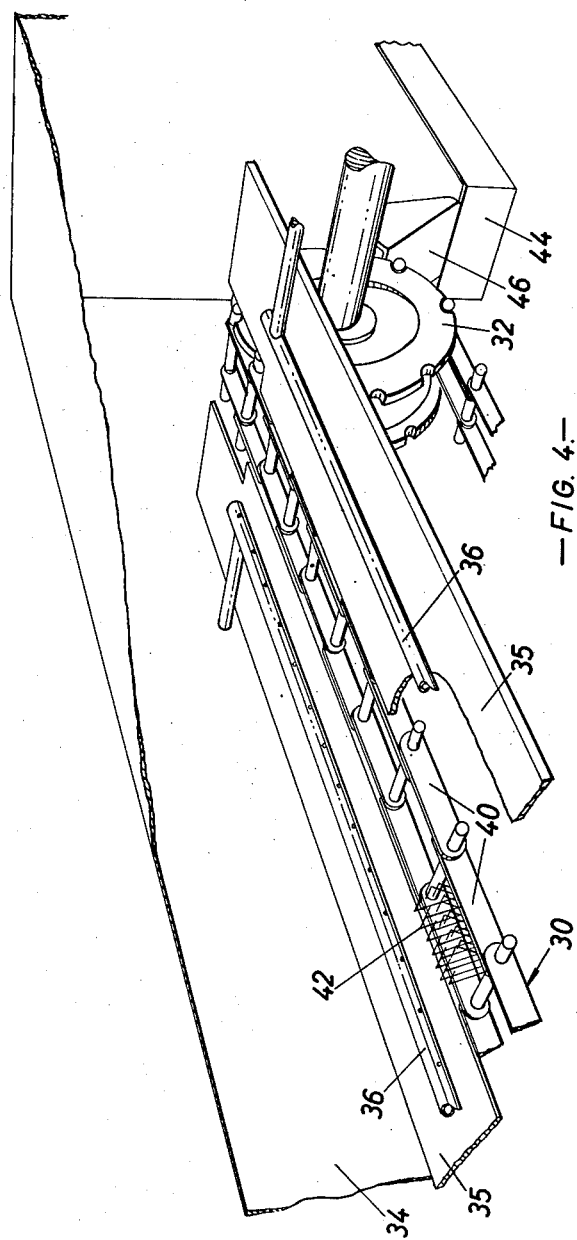

United States Patent Office 2,983,974
Patented May 16, 1961

2,983,974

HOOK FASTENER FOR TRANSMISSION OR CONVEYOR BELTS

Bernard Tebb, Tranby Lane, Swanland, and Clarence Herbert Perry, Cottingham Road, Hull, England, assignors to Mastabar Mining Equipment Company Limited, Hull, England, a British company Filed May 4, 1959, Ser. No. 810,817

Claims priority, application Great Britain May 7, 1958

2 Claims. (Cl. 24—33)

This invention relates to heavy duty power transmission, conveyor and the like belts, for example, for colliery use, and is particularly concerned with the flexible jointing of such belts.

A common manner of jointing heavy duty belting is by means of so-called wire hook fasteners, which comprise initially V-shaped wire hooks having inwardly turned, pointed ends by which the hooks are enabled to penetrate and engage in the belting on the application of suitable pressure to the hook limbs. Such fasteners are engaged in the belting end with all the loops formed by the fasteners in alignment transversely of the belt end, and two such belt ends to be jointed are brought together with the loops of one set of fasteners interlaced between the loops of the opposed set of fasteners, a pivot pin then being slipped between the inter-laced loops to complete a flexible joint.

The strength of a flexible joint so formed is dependent in part upon the strength of the individual wire fasteners, and this in turn is dependent upon such factors as the gauge of the fastener wire, the length of the limbs, and especially upon the nature of the inwardly turned, pointed hook ends when these have been fully engaged in the belting. It will be appreciated in this latter connection that if the pull exerted on a fastener under load is sufficient to initiate yielding of the pointed hook ends, the latter will thereafter rapidly unbend with respect to the hook limbs, and the hooks will consequently be pulled out of the belting.

It is an object of the invention to delay the onset of this state at which the bent hook points of a steel wire fastener commence to straighten, and thereby to provide steel hook fasteners of improved strength.

According to the present invention, in a steel wire hook fastener, at least those regions of the hook which join the limbs of the hook to the pointed end portions thereof are subjected to a localized hardening treatment to render them of greater hardness than the remaining portions of the fastener.

As a result of the hardening produced in the regions joining the hook limbs to the pointed end portions, the latter, when clenched into a belt, are substantially less able to yield when strain is applied to the fastener, than is a fastener wherein the said regions are of the same hardness as the remaining portions of the fastener.

The required hardening may, for example, be effected by heating the hook regions concerned above their critical point, rapidly quenching the heated regions, and thereafter tempering the same to reduce the resulting brittleness.

Alternatively, a simpler hardening operation comprises hardening the desired regions of the fastener by heating in the range 550° C.–600° C. and thereafter simply quenching the regions so heated.

The heating of the specified regions of the hook fasteners may be carried out in any desired manner, but in view of the desirability of localising the applied heat, infra-red heating followed by air blast cooling for quenching purposes has been found convenient.

It will be appreciated, however, that the invention is not restricted to infra-red heating, and that other electrical and high frequency current heating may be employed, as may be suitably localised flame heating. Preferably in all cases the heating is effected in an inert atmosphere, such as nitrogen.

Yet again, hardening of the required hook fastener regions may be effected by cold working the fasteners at the said regions.

According to another feature of the present invention in a hook fastener having hardened regions as proposed above, each pointed end portion is inwardly bent relative to its associated limb so as to enclose with said limb, an acute angle which is substantially less than the acute angle permissible in an identical fastener wherein said regions are not hardened.

It is already customary in wire hook fasteners employed for jointing purposes, to inwardly bend the pointed end portions of a hook relative to their associated limbs both in order to facilitate the passage of the pointed end portion through a belt end and, during subsequent clinching of the hook, to enable said pointed end portion to bend into a still more acute angle, whilst at the same time turning over the extreme end of the point so as to lie along the surface of the belt and complete the clinch. In a typical hook, before clinching, each pointed end portion will enclose an angle with its associated limb of some 55°–62°, or even more (sometimes referred to as the angle of penetration) and when the hook is being clinched by means of a suitable lacing machine, this angle is reduced to some 48°, which requires the exertion of a heavy pressure by the lacing machine, to enable the end portion to bend against the resistance offered by the material of the belt, moreover, the danger arises that the material of the belt may be crushed or even sheared by the pointed end portion while it is undergoing bending.

Due to the increased strength of the locally hardened regions of the hook, the present invention enables this angle of penetration to be substantially reduced without any risk being incurred of the pointed end portions of the hook collapsing towards the associated limbs whilst the belt is being penetrated, and enables the clinch to be completed by simply turning over the extreme point of each end portion as it cuts through the belt and contacts the jaw plate of the lacing machine. Thus the effort which is required to be exerted by an operator on the lacing machine is considerably reduced and moreover, since the effort which has to be applied to the lacing machine is reduced, this enables a reduction to be made in the weight, size and strength of such lacing machine. We have found that a convenient acute angle between the limb of a hook and the adjoining pointed end portion thereof, where the region therebetween is locally hardened, is some 50°–52°, but benefiical results as described may be obtained with angles in the range 46°–53° or even less, dependent upon the nature of the material of the hook and the hardening treatment applied thereto.

The feature of the invention whereby the clinch is completed by simply turning over the extreme point of each end portion of the hook is important, since it enables the initial angle of penetration of the hook end portions to be initially set before clinching, and thereafter to remain substantially undisturbed whilst clinching takes place. Due to the fact that no disturbance of the angle of penetration takes place, there is no bending or flexing of the hardened regions of the hook during clinching and hence said regions exhibit the same resistance to unbending after cliniching as they do beforehand. In a conventional hook fastener however, where the corresponding regions of the hook are unhardened, the said regions are caused to flex and bend during clinching, and the consequent working of the metal in said regions which takes place lowers its resistance to unbending.

According to yet another feature of the present invention, the effort required to be exerted by the lacing machine may additionally or alternatively be reduced, irrespective of whether the pointed end portion of the hook fastener are set at a lesser angle of penetration than in a corresponding conventional fastener, by hardening not only the regions which join each end portion to its associated limb, but by extending said hardening to the whole of each pointed end portion.

It has been found that in this way, not only are the advantages of the invention retained whereby a hook fastener so treated displays improved resistance to unbending, and if desired, a reduced angle of penetration may be employed, but in addition, one or both pointed end portions of the hook may be of such a length as just to pass through the thickness of a belt, without then projecting therefrom to any significant extent. In consequence, it is not necessary for the extreme points of said end portions to be turned over during clinching, and the effort required to be exerted by the lacing machine is correspondingly reduced. Moreover, the shorter length of the end portions facilitates the passage of the same through the belt and assists in reducing the effort required of the lacing machine.

The required hardening treatment of the said regions of the hook fasteners may, as mentioned above, be accomplished by infra-red heating or by suitably localised flame heating. In the latter connection we have found that heating for hardening and quenching purposes may be carried out in a gas-air torch followed by subsequent tempering for example, in an electric oven or a molten salt bath. Yet again, the heating may be by means of electrical resistance heating. In all cases the heating is of course confined to the area around the hook limbs and associated end portions, but not extending up to the extreme point of the hook. Again, where a plurality of hooks are joined in spaced relation by means of a wire extending across them, the heating proposed by the invention is arranged not to extend as far as the said wire.

Hooks treated in accordance with the invention have been found to be capable of bearing a load of some 20% more than the maximum load which can be exerted on a comparable untreated hook.

The invention will be described further, by way of example, with reference to the accompanying generally diagrammatic drawings, in which:

Fig. 1 is an elevation of a wire hook fastener of conventional form;

Fig. 2 is a similar elevation of a wire hook fastener treated as proposed by the invention;

Fig. 3 is a sectional detail of part of an apparatus for heat treating wire hook fasteners as proposed by the invention; and Fig. 4 is a detail in perspective of the apparatus shown in Fig. 3.

The wire hook fastener shown in Fig. 1, which is formed of steel wire, is typical of such fasteners as currently employed in the formation of flexible joints in heavy duty belting, and will be seen to have two limbs 10 and 12 mutually inclined relative to one another and joined together at the crown of the V so formed. The limbs 10 and 12 respectively terminate in pointed end portions 14 and 16, and these end portions 14 and 16 are inwardly directed so as each to enclose an angle $x$ usually of between 55° and 62° with its associated limb. When such a hook fastener is clinched into a belt end, the end portions 14 and 16 pass in opposite directions through the thickness of the belt and the extreme points of said end portions emerge from the belt faces opposite those at which they entered the belt, and are there turned over to be flat along the belt face as the clinching operation is completed. As a result of the clinching operation, the angle $x$ is reduced, generally to a value of about 48°, and this reduction in the angle $x$ is responsible for a substantial part of the effort required to effect clinching.

Fig. 2 shows a similar wire hook fastener in which the regions joining the pointed end portions 14 and 16 to their associated limbs 10 and 12 have been hardened in accordance with the invention. The hardened regions of the hook fastener of Fig. 2 are indicated as being those regions of the limb 10 and end portion 14 which are joined together and both lie on the same side of the chain-dotted line 18, and the corresponding regions of the limb 12 and end portion 16 which both lie on the same side of the chain dotted line 20. It is very desirable that the extreme points of the end portions 14 and 16 and the parts of the limbs 10 and 12 forming the crown of the V are not hardened, since that might hinder or adversely affect a proper clinching of the resulting hook fastener.

Although a number of methods of accomplishing the required hardening of the hook fastener have already been mentioned herein, the presently preferred method is by localised flame heating and subsequent quenching and tempering. One apparatus for carrying out localised flame heating is diagrammatically shown in Figs. 3 and 4, which are intended simply to illustrate the general principles involved in the heat treatment. The apparatus will be seen to comprise a chain conveyor generally designated 30 which is caused by a sprocket wheel 32, driven in any convenient manner, to move through a chamber 34 wherein are provided gas heating jets 36. A plurality of wire hook fasteners is carried in mutually spaced relation on a support wire 38 so as to form a composite unit 42 of fasteners all adapted to be simultaneously clinched into a belt and is supported in each link 40 of the chain 30, only one unit 42 being shown in Fig. 4 for clarity. The transverse width of the chain links 40 is so arranged in relation to the size of the fasteners being treated that only the pointed end portions 14 and 16 of the hooks, and the adjoining parts of the limbs 10 and 12, project above the links 40, so that at least the crown parts of the limbs are shielded from direct heating by the gas jets 36. Preferably the jets 36 are so controlled that direct heating of the extreme points of the end portions 14 and 16 does not occur. As a safeguard against undesirable heating of the crowns of the hooks, the jets 36 may be arranged above heat deflectors 35 extending from the walls of the chamber 34, and in addition, during their travel past the gas jets 36, the extreme points of the hooks and the crown parts of the limbs 10 and 12 may be arranged to slide along means (not shown) constituting heat sinks, whereby to avoid heating of such parts of the hooks to an undesirable extent.

The speed of the conveyor chain 30 and the number and temperature of the gas jets 36 are so arranged as to effect the requisite degree of heating of the hook parts to be hardened during passage of the hooks through the chamber 34, and nitrogen or other inert gas may be supplied to chamber 34 to maintain an inert atmosphere therein. At the delivery end of the chamber 34 there is then arranged a quenching and tempering bath 44 into which the heated units 42 are caused to fall, for example down a chute 46, as the chain 30 passes around the sprocket wheel 32. After remaining in the bath 44 for a suitable time, the units 42 may then be removed and washed ready for subsequent finishing operations such as plating and inspection.

In a typical heat treatment operation as described above, units 42 of wire hook fasteners are maintained at a temperature of 820° C. in the chamber 34 for a period of 12 seconds, after which they are plunged into the bath 44, which in this instance comprises molten salt at a temperature of 285° C., where they are allowed to remain and temper for a period of two minutes. After tempering, the fastener units 42 are then removed from the bath 44, washed and allowed to cool and dry in air at ambient temperature. The figures given in this typical example are, of course, those applicable to a particular steel, and variations in the temperatures stated of up to 20° C., and in the times given of up to 10% have been found necessary with other steels.

It has been mentioned herein that the localised hardening treatment proposed by the invention delays the onset of the condition at which the pointed end portions of a hook fastener commence to straighten out relative to the hook limbs, and we have found in practice that due to this feature, the load-bearing capacity of a treated hook fastener is typically some 20% greater than that of an untreated fastener. By way of example, a uniform coil of cold drawn steel wire of a diameter of 0.092 inch was made into wire hook fasteners having limbs 10 and 12 of length 1.77 inches and 1.40 inches respectively, these limbs terminating in pointed end portions 14 and 16 of lengths 0.78 inch and 0.67 inch respectively. The angle included between the limbs 10 and 12 was 69°, the angle between the limb 10 and end portion 14 was 57° and the angle between the limb 12 and end portion 16 was 55°. Some of the fastener hooks thus obtained were locally hardened by heat treatment as described above, and all the fastener hooks were then subjected to tests to determine their load-bearing capacities. It was found that the locally hardened fastener hooks would sustain an average load of 420 lbs., whereas the untreated hooks would sustain a load of only 350 lbs.

Fig. 2 of the drawings also shows the further feature of the invention, that in a hook fastener having locally hardened regions as described, the end portions 14 and 16 may enclose reduced angles $y$ with the limbs 10 and 12, as compared with the enclosed angles $x$ of an unhardened fastener hook.

We claim:
1. In a method of manufacturing steel wire hook fasteners for jointing heavy duty belting and of the type consisting of a pair of mutually inclined limbs joined by a crown portion, and an inwardly directed, pointed end portion at the free extremity of each limb, the improvement comprising inwardly bending each pointed end portion of a hook fastener relative to its associated limb so as to enclose with said limb, an angle lying in the range 46°–53°, and locally hardening at least those regions of said hook fastener which join said limbs to said pointed end portions to thereby render said regions of greater hardness than the remaining parts of said fastener.

2. A steel wire hook fastener for jointing heavy duty belting, and of the type consisting of a pair of mutually inclined limbs joined by a crown portion, and an inwardly directed, pointed end portion at the free extremity of each limb, characterised in that at least those regions of the hook fastener which join said limbs to said pointed end portions are locally hardened to render said regions of greater hardness than the remaining portions of said hook fastener, and wherein each pointed end portion is inwardly bent relative to its associated limb so as to enclose with said limb, an acute angle lying within the range 46°–53°.

References Cited in the file of this patent

UNITED STATES PATENTS

| | | |
|---|---|---|
| 2,202,758 | Denneen et al. | May 28, 1940 |
| 2,367,969 | Smith | Jan. 23, 1945 |

FOREIGN PATENTS

| | | |
|---|---|---|
| 976,566 | France | Nov. 1, 1950 |

OTHER REFERENCES

Merriman: "A Dictionary of Metallurgy," No. TN 609.M47, page 119.